United States Patent [19]
McCall

[11] Patent Number: 6,037,542
[45] Date of Patent: Mar. 14, 2000

[54] ELECTRICALLY INSULATING TILE SWITCH PLATE COVER

[76] Inventor: Sherry McCall, 1185 Chat Holley Rd., Santa Rosa Beach, Fla. 32459

[21] Appl. No.: 09/131,212

[22] Filed: Aug. 7, 1998

[51] Int. Cl.[7] ................................................ H02G 3/14
[52] U.S. Cl. ..................... 174/66; 174/55; 220/242; 220/3.8
[58] Field of Search ............................. 174/55, 66, 67, 174/17 CT; 220/241, 242, 3.8; D8/353; D13/177; 200/43.19

[56] References Cited

U.S. PATENT DOCUMENTS

| | | | |
|---|---|---|---|
| 3,432,611 | 3/1969 | Gaines et al. | 174/66 |
| 4,312,458 | 1/1982 | Stewart | 220/241 |
| 4,835,343 | 5/1989 | Graef et al. | 174/66 |
| 5,675,125 | 10/1997 | Hollinger | 174/66 |
| 5,693,911 | 12/1997 | Sydow | 174/66 |
| 5,768,842 | 6/1998 | Austin | 52/302.3 |

FOREIGN PATENT DOCUMENTS

| | | | |
|---|---|---|---|
| 2085229 | 4/1982 | United Kingdom | 174/66 |
| 2216070 | 10/1989 | United Kingdom | 174/66 |

*Primary Examiner*—Kristine Kincaid
*Assistant Examiner*—Dhiru R Patel
*Attorney, Agent, or Firm*—John Wiley Horton

[57] ABSTRACT

A new type of cover plate for an electrical switch or electrical outlet. One or more lower substrates are bonded to one side of an upper substrate. A plurality of tiles is bonded to the opposite side of the upper substrate in any desired pattern. Grout is placed in the gaps between the tiles. Standard mounting holes and access slots for the light switch or electrical receptacles are provided, extending through the entire assembly. The completed assembly is then affixed to the outlet or switch, with the tiles facing outward.

3 Claims, 7 Drawing Sheets

ELECTRICALLY INSULATING TILE SWITCH PLATE COVER

BACKGROUND—FIELD OF INVENTION

This invention relates to cover plates for light switches, electrical outlets, and the like.

BACKGROUND—DESCRIPTION OF PRIOR ART

Cover plates for electrical outlets and switches have been in existence for as long as residential electricity has been available. These plates have now become standardized, with the locations of the mounting holes and the openings for the outlets and switches being fixed. Numerous modifications have been created and patented, focusing primarily on safety. For example, U.S. Pat. No. 5,107,075 to Currier, Jr. (1992) provides a spring-loaded sliding cover to prevent a child from tampering with an electrical outlet. U.S. Pat. No. 4,895,527 to Brown (1990) employs a fixed cover to achieve the same end. U.S. Pat. No. 4,740,655 to Ford (1988) uses a hinged cover locked by a sliding action. U.S. Pat. No. 4,586,765 uses another type of rigid cover to deny access. All of these inventions focus on safety.

The standardization of these cover plates has been helpful to electricians and designers of electrical equipment, but it carries one substantial drawback: For kitchen and bath applications, the cover plates are often mounted on beautiful tile or stone back splashes. The homeowner may spend many thousands of dollars having custom stone or tile work done. Yet, the back splash must be finished off with one of the standardized, cheap, and very plain-looking cover plates. The homeowner has a very limited choice of colors, virtually no choice in shape or design of the cover, and no real choice as to the material the cover is made of. It is therefore impossible to really incorporate the cover into the stone or tile work in any sort of desirable fashion. Instead, the cover winds up being a sort of disfigurement of the other work. Additionally, nearly all of the modern cover plates are injection-molded plastic. This methodology is very cost effective for high volume production, but it is inefficient for low volume production, such as a run of five hundred "semi-custom" units.

The known switch or outlet cover devices are therefore limited in that they: (1) Do not provide for the desired "customization" in shape or design; (2) Do not allow for the matching of the materials used in a tile or stone back splash; and (3) Require expensive tooling to produce, such as injection molds.

OBJECTS AND ADVANTAGES

Accordingly, several objects and advantages of the proposed invention are:

(1) to allow the easy modification of size, shape and texture of the cover plate;

(2) to allow the cover plate to be made from materials resembling the tile or stone materials it will be adjacent to; and (3) to allow limited production of a designed shape with reasonable economy.

These objects and advantages will be fully explained in the details hereafter described, explained, and claimed, with reference being made to the accompanying drawings.

Figure 1:
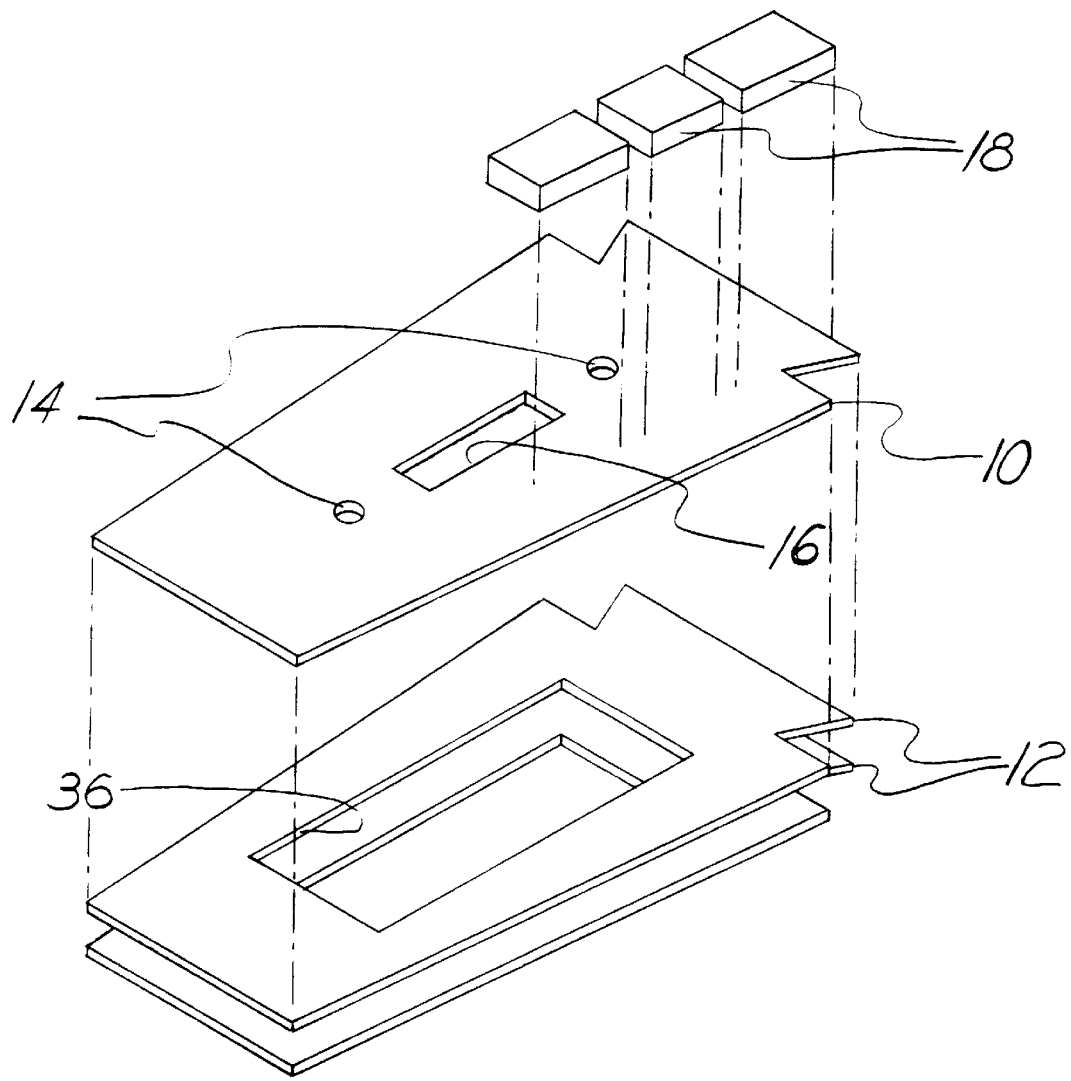
FIG. 1 is an exploded isometric view, showing how the components of the proposed invention are assembled for the version adapted to cover a light switch.

| Reference Numerals in Drawings | |
|---|---|
| 10 | switch substrate |
| 12 | lower substrate |
| 14 | mounting hole |
| 16 | switch slot |
| 18 | tile |
| 20 | outlet substrate |
| 22 | outlet slot |
| 24 | center mounting hole |
| 26 | grout |
| 28 | light switch cover |
| 32 | mounting screws |
| 34 | electrical outlet cover |
| 36 | relief slot |
| 38 | light switch |
| 40 | threaded mounting hole |
| 42 | alternate switch substrate |
| 44 | integral tiles |
| 48 | alternate outlet substrate |
| 50 | outer face |

DETAILED DESCRIPTION OF THE DRAWINGS

The preferred embodiment of the invention is illustrated in FIG. 1. Switch substrate 10 has switch slot 16 and mounting holes 14 located in a standard fashion to align with the threaded holes and paddle switch of a commercial electrical light switch. The material selected for switch substrate 10 should be thin but reasonably rigid. For example, the laminate commonly used on kitchen counter tops may be used. Switch slot 16 and mounting holes 14 may be sawn or punched. Since both these features are standardized and must be repeated for every switch substrate 10, it is advantageous to use a set of steel punches mounted in a press to rapidly punch these features into switch substrate 10.

The outer perimeter of switch substrate 10 may be cut or punched to any desired shape. It may be easily cut using a band saw, so that many custom shapes and designs may be rapidly created. If a limited production run of more than a few dozen units is desired, it is advantageous to employ punch tooling to punch the outer perimeter as well.

Lower substrates 12 are adhesively bonded to switch substrate 10 using any suitable adhesive. Lower substrates 12 are generally made of the same thin, rigid material as switch substrate 10. It is also possible to make switch substrate 10 from a different, conductive material, such as stainless steel. Lower substrates 12, however, should be made of non-conductive material, in order to minimize the possibility of conducting current from the electrical switch.

Lower substrates 12 each have relief slot 36, sized and located to prevent lower substrates 12 from bearing against the front face of the light switch. Relief slots 36 are standardized in shape and location, and they may be economically produced using punch tooling. The outer perimeter of lower substrates 12 may be cut or punched in the same manner as the outer perimeter of switch substrate 10. If the outer perimeters are cut rather than punched, it is desirable to perform the cutting after switch substrate 10 has been bonded to lower substrates 12. In that way, a flush edge on the outer perimeter may be ensured.

After switch substrate 10 has been adhesively bonded to lower substrates 12, tiles 18 are bonded to outer face 50 of switch substrate 10 as shown. Tiles 18 may be made of many materials, including, without limitation, fired ceramic, stone, or glass. Tiles 18 are bonded using ceramic tile adhesive, quick set epoxy, or any other suitable adhesive. Numerous tiles 18 are placed on switch substrate 10 until a desired pattern is created. A completed pattern is illustrated in FIG. 2.

Figure 2:
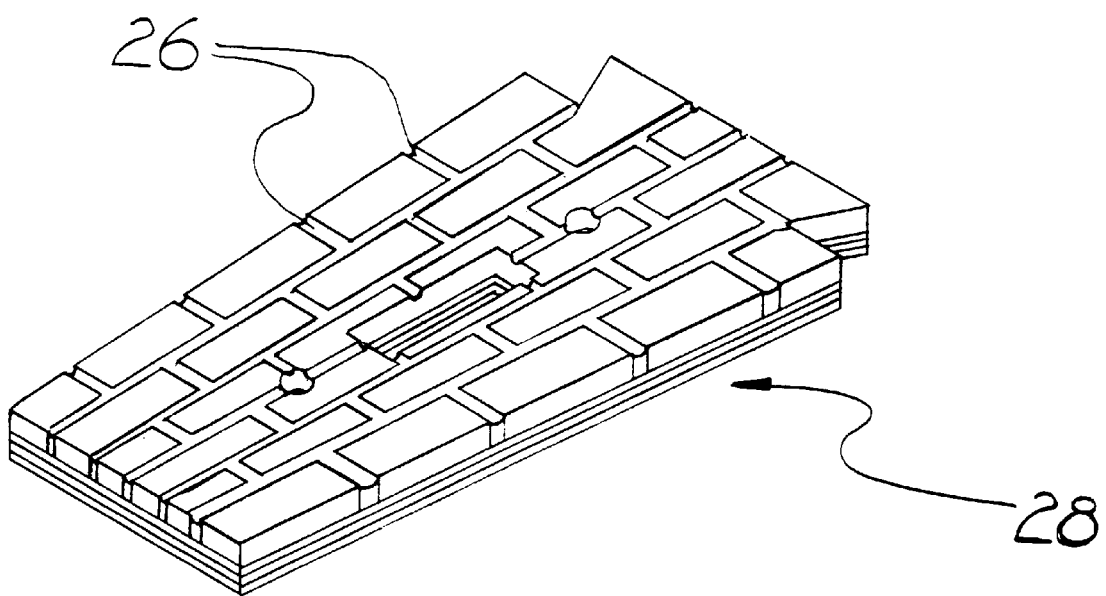
FIG. 2 is a conventional isometric view, showing the assembled invention from FIG. 1.
Figure 7:
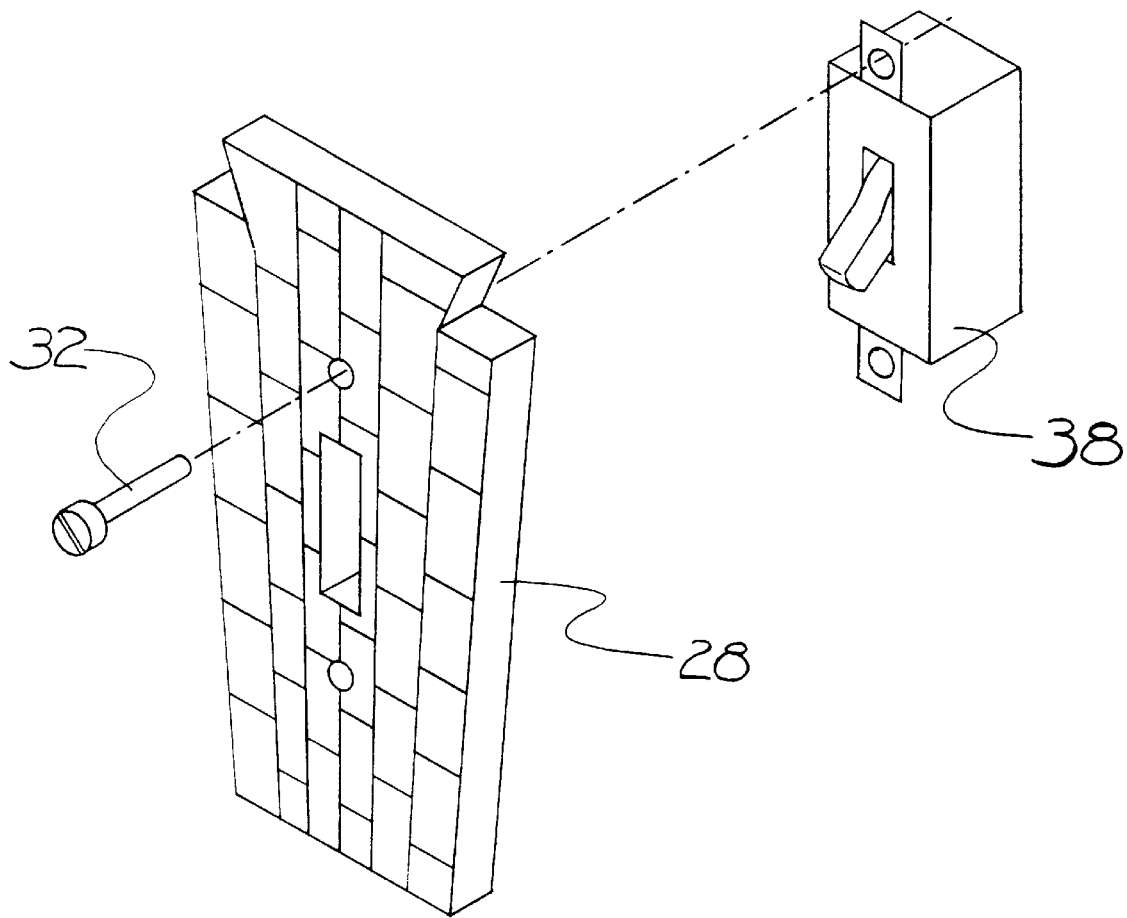
FIG. 7 is an exploded isometric view, showing how the completed invention from FIG. 1 is attached to a light switch.

FIG. 2 shows the completed assembly of light switch cover 28. After all tiles 18 have been adhered to switch substrate 10, and the adhesive has been allowed to properly cure, grout 26 is placed in the gaps between tiles 18. Grout 26 is applied in the same fashion as for a tile floor or tile back splash. It is wiped on using a float or squeegee and pressed down into the gaps between tiles 18. FIG. 7 illustrates how the completed light switch cover 28 is attached to light switch 38. Mounting screws 32 are placed in mounting holes 14 and threaded into threaded mounting holes 40 in light switch 38. As mounting screws 32 are tightened, light switch cover 28 is drawn snugly against the front face of light switch 38.

The reader will appreciate that an infinite variety of different light switch covers 28 may be created as described in the foregoing. It is easy to create a completely unique light switch cover 28 having an appearance consistent with the tile or stone back splash it is to be placed against. The reader will also appreciate that the use of inexpensive punch tooling will allow the economical production of identical light switch covers 28 having a common design.

Figure 3:
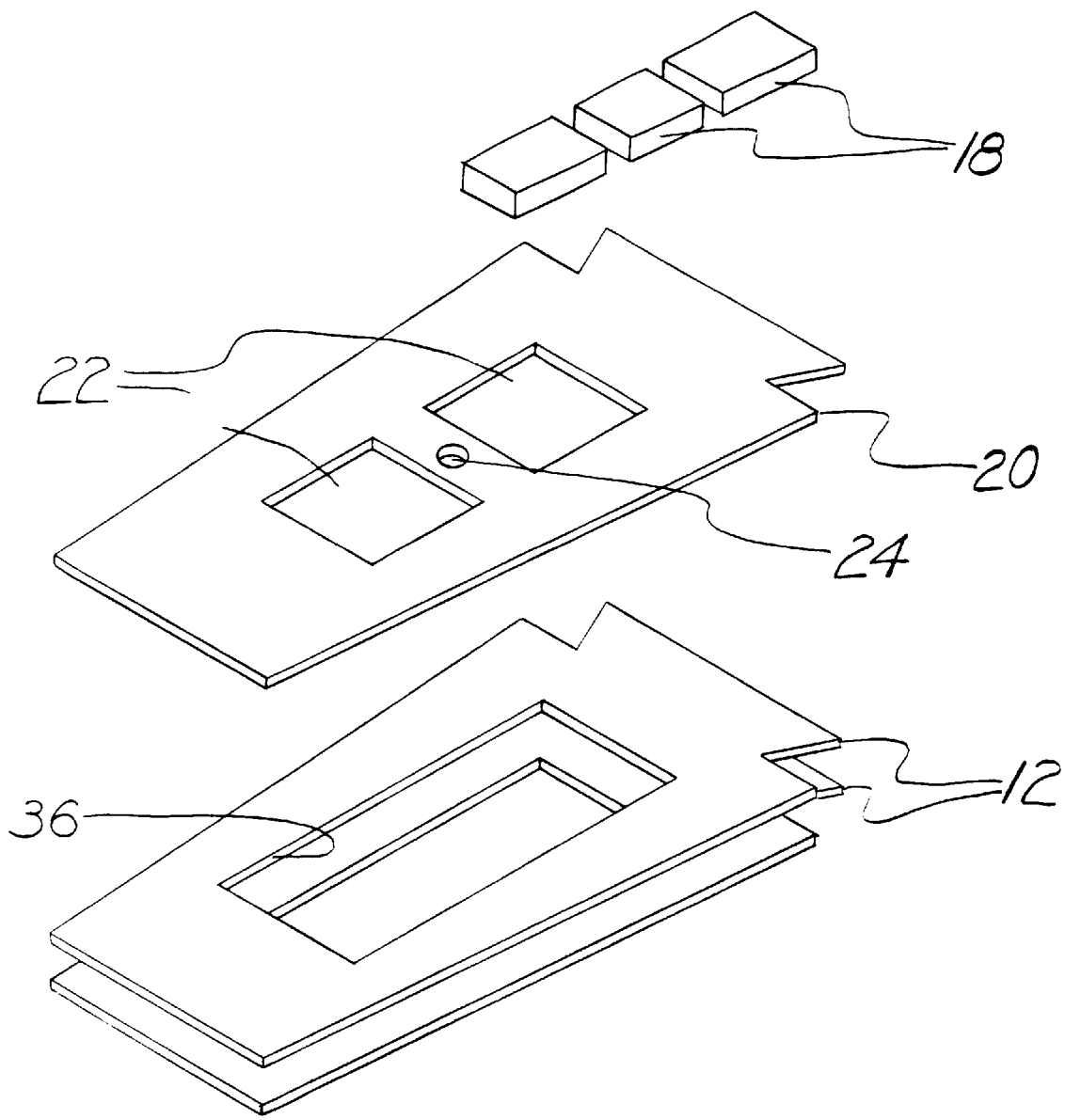
FIG. 3 is an exploded isometric view, showing how the components of the proposed invention are assembled for the version adapted to cover an electrical outlet.

FIG. 3 illustrates a version of the invention adopted to cover an electrical outlet. Outlet substrate 20 is created using the same type of material and the same methods as switch substrate 10. Center mounting hole 24 is provided for attaching the completed device to an electrical outlet. Outlet slots 22 are provided to allow access to the receptacle plugs of a standard two-outlet electrical receptacle. Since both center mounting hole 24 and outlet slots 22 are standardized in size and location, it is advantageous to use a set of steel punches mounted in a press to rapidly punch these features into outlet substrate 20.

Lower substrates 12 are adhesively bonded to outlet substrate 20 in the same manner as described for switch substrate 10. Lower substrates 12 shown in FIG. 3 are identical to the ones shown in FIG. 1. Relief slots 36 are sized to accommodate either a light switch or an electrical outlet. Tiles 18 and grout 26 are applied in the same manner as described for light switch cover 28.

Figure 4:
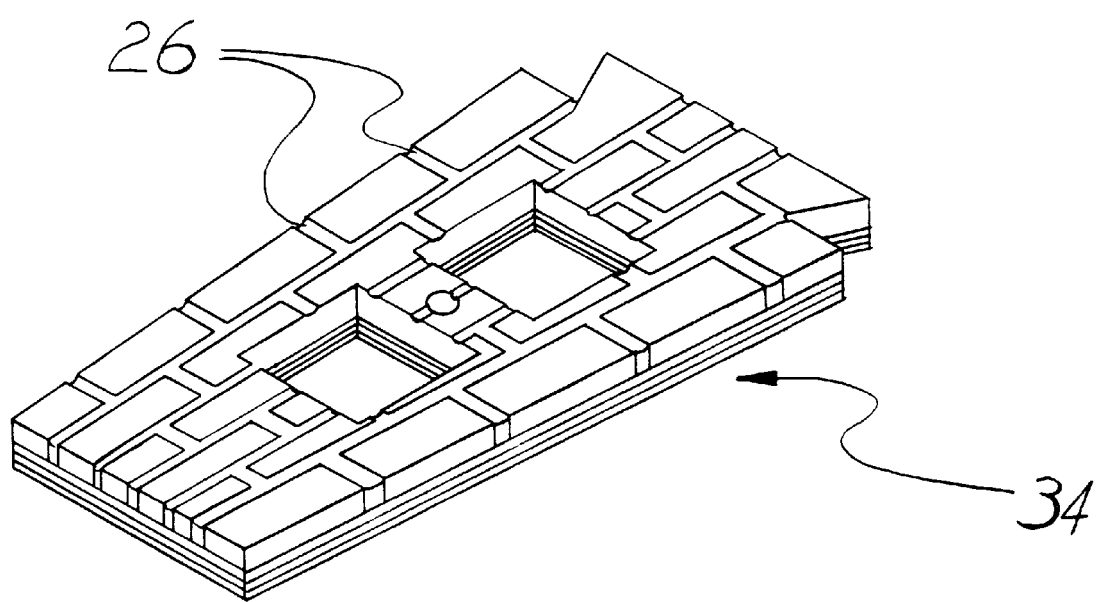
FIG. 4 is a conventional isometric view, showing the assembled invention from FIG. 3.

FIG. 4 illustrates a completed electrical outlet cover 34. The completed unit is attached to an electrical outlet by threading a screw through center mounting hole 24 and into the threaded hole in the center of the outlet (not shown).

The reader will appreciate that the invention just described allows the creation of many different "custom" switch and outlet covers. The tile and stone artisan is thereby able to incorporate the previously intrusive outlet covers into the artistic design of a tile or stone back splash, or any other type of tile or stone work. However, the reader will also appreciate that the methods described are labor intensive. The substrates must be sawn or punched, and each individual tile 18 must be cut, placed, and adhered. These concerns are often negligible for high-end tile and stone work, where the overall expense of the job is high enough to justify the time spent on the light switch and electrical outlet covers. There would be a significant advantage gained, though, if creative and artistic covers could be supplied for more moderately-priced projects.

Figure 5:
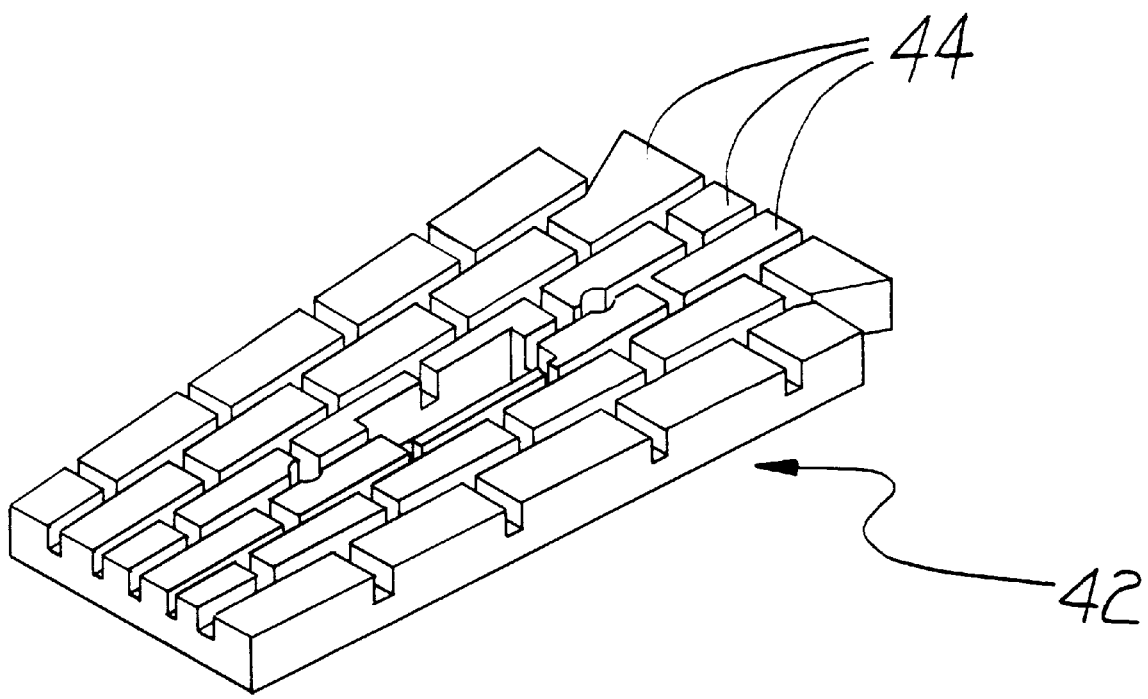
FIG. 5 is an isometric view, showing a proposed alternate embodiment for the version adapted to cover a light switch.

FIG. 5 illustrates an alternate embodiment of the proposed invention. Alternate switch substrate 42 is molded as an integral unit using one material. Integral tiles 44 are molded into the upper surface of alternate switch substrate 42. A suitable molding material is ceramic clay. The preferred molding method is to press the wet clay into a suitable cavity, but many different methods could be employed.

The upper surface of integral tiles 44 may be painted with ceramic paints to create a design. When the painting is complete, alternate switch substrate 42 is then fired in a kiln to harden the clay and lock in the painted colors. After switch substrate 42 is removed from the kiln and suitably cooled, grout is applied in the spaces between integral tiles 44, in the same manner as described for light switch cover 28.

Many different materials could be used to form the molded substrate. For example, a fiber-reinforced thermoplastic resin could be employed. Obviously this version would not be fired in a kiln, but would just be painted and grouted. Die cast or investment cast metals could also be used to form the molded substrate. The selection of the material is not significant. Ceramic has been specifically described because it may be easily molded and produces a desirable appearance.

Once grouted, alternate switch substrate 42 has the same external appearance as light switch cover 28. However, the reader will appreciate that in order to change the shape and tile placement for alternate switch substrate 42 a new mold must be created. Thus, alternate switch substrate 42 is intended for volume production of several hundred units. While it has the same advantages of consistency in appearance with the tile or stone against which it will be placed, it is not really a "custom" unit like light switch cover 28.

Figure 6:
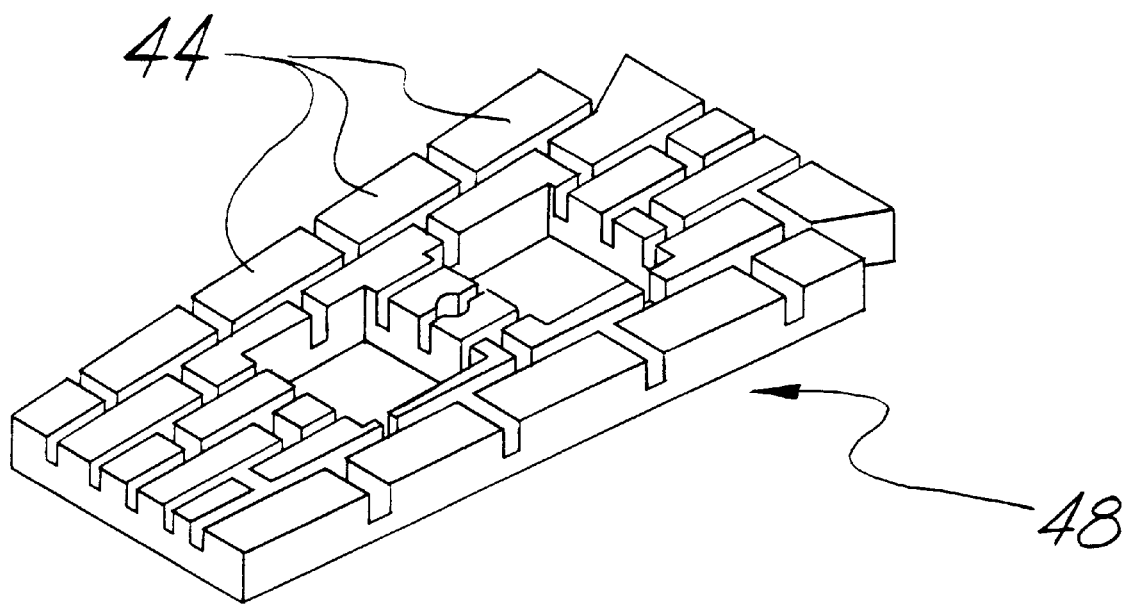
FIG. 6 is an isometric view, showing proposed alternate embodiment for the version adapted to cover an electrical outlet.

The reader will also appreciate that an alternate embodiment of electrical outlet cover 34 may also be created using the same methods as described for alternate switch substrate 42. FIG. 6 illustrates alternate outlet substrate 48. Alternate outlet substrate 48 is molded as an integral unit using one material. Integral tiles 44 are molded in the same fashion as for alternate switch substrate 42.

Center mounting hole 24 and outlet slots 22 are provided in alternate outlet substrate 48, just as for outlet substrate 20. The upper surface of integral tiles 44 may be painted using the same methods described for alternate switch cover 46. After the molding material for alternate outlet substrate 48 is suitably fired or cured, grout is placed in the gaps between integral tiles 44 (not shown).

From the description above, a number of advantages of the proposed invention are apparent:

1. The size, shape, and texture of the cover plate is easily modified to match the tile or stone surface surrounding it.
2. The outer surface of the cover plate may actually be made from tile or stone so as to match the materials surrounding it.
3. A "custom" design may be manufactured with reasonable economy.

4. A limited production run of a standardized design may be manufactured with reasonable economy.

Although the preceding description contains significant detailed information, it should not be construed as limiting the scope of the invention but as providing illustrations of some of the preferred embodiments of the invention. As discussed above, many different materials could be used for alternate switch cover 42 without changing the nature of the invention.

Accordingly, the scope of the invention should be fixed by the following claims, rather than by the examples given.

Having described my invention, I claim:

1. A cover plate for covering an electrical light switch box or an electrical outlet box while still allowing access to a light switch or electrical outlet therein, which may be attached using the mounting screws commonly found with said light switch box or said outlet box, comprising:
   a. at least one lower substrate, sized to completely cover either of said boxes, with said at least one lower substrate including a relief slot passing completely therethrough, with said relief slot being sized and configured to allow access to a front face of either of said boxes;
   b. an upper substrate, adhesively affixed to said at least one lower substrate, sized to completely cover either of said boxes, with said upper substrate including at least one slot passing completely therethrough, with said at least one slot being sized and configured to allow access to said light switch, with said upper substrate further including at least one mounting hole, with said at least one mounting hole being sized and located to accommodate said mounting screws;
   c. a plurality of electrically insulating tiles, extending upward from said upper substrate and adhesively affixed thereto in any desired pattern; and
   d. a layer of grout, placed in the gaps between said tiles and adhesively affixed to said upper substrate.

2. A cover plate for covering an electrical light switch box or an electrical outlet box while still allowing access to a light switch or electrical outlet therein, which may be attached using the mounting screws commonly found with said light switch box or said outlet box, comprising:
   a. at least one lower substrate, sized to completely cover either of said boxes, with said at least one lower substrate including a relief slot passing completely therethrough, with said relief slot being sized and configured to allow access to a front face of either of said boxes;
   b. an upper substrate, adhesively affixed to said at least one lower substrate, sized to completely cover either of said boxes, with said upper substrate including at least two slots passing completely therethrough, with said at least two slots being sized and configured to allow access to said electrical outlet, with said upper substrate further including at least one mounting hole, with said at least one mounting hole being sized and located to accommodate said mounting screws;
   c. a plurality of electrically insulating tiles, extending upward from said upper substrate and adhesively affixed thereto in any desired pattern; and
   d. a layer of grout, placed in the gaps between said tiles and adhesively affixed to said upper substrate.

3. A cover plate for covering an electrical light switch box or an electrical outlet box while still allowing access to a light switch or electrical outlet therein, which may be attached using mounting screws commonly found with said light switch box or said outlet box, comprising:
   a. an alternate substrate, sized to completely cover either of said boxes, with said alternate substrate including at least one slot passing completely therethrough, with said at least one slot being sized and configured to allow access to either of said light switch or said electrical outlet;
   b. a plurality of electrically insulating integral tiles, formed integrally with said alternate substrate and extending upward therefrom, so as to produce a pattern of raised integral tiles and adjoining gaps between said raised integral tiles;
   c. with said alternate substrate further including at least one mounting hole, passing completely therethrough, with said at least one mounting hole being sized and located to accomodate said mounting screws; and
   d. a layer of grout, placed in said adjoining gaps between said integral tiles and adhesively affixed to said alternate substrate.

* * * * *